Figures 1, 2:
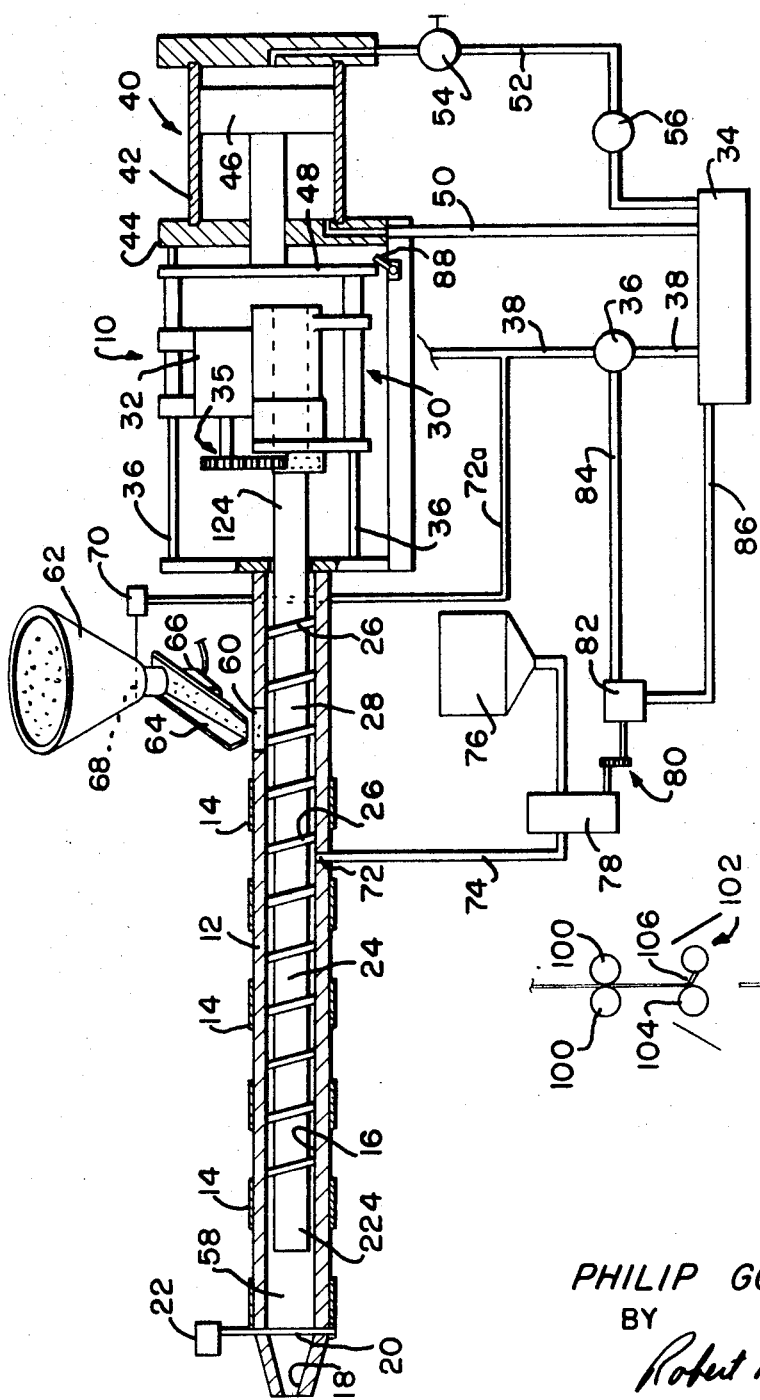

United States Patent

[11] 3,583,679

| [72] | Inventor | Philip Godley, II<br>Wilton Center, N.H. |
|---|---|---|
| [21] | Appl. No. | 774,055 |
| [22] | Filed | Nov. 7, 1968 |
| [45] | Patented | June 8, 1971 |
| [73] | Assignee | Improved Machinery Inc.<br>Nashue, N.H. |

[54] SCREW FEEDING METHOD AND APPARATUS
12 Claims, 2 Drawing Figs.

[52] U.S. Cl. ............................................ 259/5,
18/30SR, 83/913, 264/128
[51] Int. Cl. ............................................ B01f 3/14,
B01f 7/08
[50] Field of Search ........................................ 259/4—6,
7, 9, 10, 149, 25, 2, 18, 19, 20, 36—38, 39,
99—101; 18/30 SRR, 30 SRM; 165/86, 87, 109;
222/404, 1; 264/128, 122

[56] References Cited

UNITED STATES PATENTS

| 2,745,491 | 5/1956 | Sonneborn et al. | 83/913X |
|---|---|---|---|
| 3,347,528 | 10/1967 | List et al. | 259/2 |

FOREIGN PATENTS

| 660,871 | 4/1963 | Canada | 259/2 |
|---|---|---|---|
| 1,233,831 | 2/1967 | Germany | 259/5 |
| 749,957 | 6/1956 | Great Britain | 259/25 |

*Primary Examiner*—Walter A. Scheel
*Assistant Examiner*—Leon G. Machlin
*Attorneys*—Carl R. Horten, David W. Tibbott and Robert R. Paquin ABSTRACT: A method of feeding a plurality of substances (such as the paste and fiber components of a conventional polyester premix) to an injection screw, wherein the substances are supplied to the screw through separate inlets spaced longitudinally of the screw. Also, an injection screw provided with means for so feeding the screw.

PATENTED JUN 8 1971  3,583,679

INVENTOR
PHILIP GODLEY II
BY
Robert R. Paquin
ATTORNEY

SCREW FEEDING METHOD AND APPARATUS

The present invention relates to screw feeding apparatus and methods and more specifically to apparatus and methods particularly adapted for feeding a plurality of substances (such as the paste and fiber components of a conventional polyester premix) to an injection screw.

In the past, attempts have been made to employ an injection screw for injecting a conventional polyester premix to the mold of a molding machine. (By way of illustration, a typical conventional polyester premix normally includes a paste component formed by a polyester resin and filler such as talc, and also a fiber component formed by glass fiber or the like.) These prior attempts have, however, been generally unsuccessful due to problems encountered in feeding the polyester premix to the injection screw in a form enabling the screw to inject a mixture suitable for the molding operation. These problems, it is believed, have been caused by feeding all of the components or substances of the premix to the screw through a single inlet.

An object of the present invention is to provide a new and improved method particularly adapted for feeding a plurality of substances (such as the paste and fiber components of a polyester premix) to an injection screw whereby the screw is enabled to discharge a mixture of the substances suitable for molding.

Another object of the invention is to provide a new and improved screw feeding method which is particularly adapted whereby the substances are supplied to the screw at different locations.

In general, the method provided by the present invention contemplates supplying a first of the substances to the screw through a first inlet spaced longitudinally of the screw from the discharge opening through which the screw is to discharge, and supplying a second of the substances to the screw through a second inlet spaced longitudinally of the screw from the discharge opening and separate from the first inlet, whereby movement of the screw causes intermixing of the substances and provides through the discharge opening a mixture thereof.

Another object of the invention is to provide new and improved means particularly adapted for feeding a plurality of substances (such as the paste and fiber components of a polyester premix) to an injection screw whereby the screw discharges a mixture of the substances suitable for molding.

Another object is to provide new and improved screw feeding means particularly constructed and arranged to feed a screw at a plurality of separate locations.

In general, this object is attained by the provision of first supply means for supplying a first substance to the screw through a first inlet spaced longitudinally of the screw from the discharge opening, and second supply means for supplying a second substance to the screw through a second inlet separate from the first inlet whereby movement of the screw causes intermixing of the substances and provides through the discharge opening a mixture thereof.

Referring to the drawings:

FIG. 1 schematically illustrates an injection screw provided with means constructed in accordance with the present invention and adapted to feed the screw in accordance with the method of the invention; and FIG. 2 is a schematic showing of an alternative apparatus for feeding one of the substances to the screw.

Referring more particularly to the drawings and with specific reference to FIG. 1, 10 generally designates an injection unit adapted to supply plasticized material to the mold of a conventional injection molding machine. The injection unit 10 comprises an elongated injection barrel 12 provided with the usual circumferential temperature controlling coils 14 and containing an axial cylindrical bore 16 which communicates with the coaxial injection or discharge opening 18 through which the plasticized material is discharged. The injection opening 18 is provided with a normally closed, shutoff valve 20 which is operated by a solenoid controlled hydraulic cylinder-and-piston control 22 to selectively permit discharge of plasticized material through the discharge opening 18 to the mold of the injection molding machine.

A conventional injection screw 24, provided with circumferential helical flights or thread 26 and lands 28, is axially located in the bore 16 for rotary and axial reciprocating movement. The rearward or right-hand end 124 of the screw 24 projects from the bore 16 and is connected to a carriage, designated generally as 30, such that the screw 24 is axially movable conjointly with, and rotatable relative to, the carriage 30. The carriage 30 carries a conventional hydraulically operated, rotary motor 32 which is powered by hydraulic fluid supplied from a source or reservoir 34 by a pump 36 through a supply conduit 38. The pump 36, as will be understood, is electrically operated during rearward axial movement of the screw 24. The rotary motor 32 is connected by suitable conventional gearing 35 to the end 124 of the screw 24 whereby the screw 24 is rotatably driven by the rotary motor 32 during the operation of the latter.

The carriage 30 is slidably mounted on a plurality of tie rods 36 for axial movement towards and away from the barrel 12 and is axially driven towards the barrel 12 by a cylinder-and-piston arrangement designated generally as 40. The arrangement 40, as illustrated, comprises a stationary cylinder 42 affixed to a support 44 and a piston 46 slidably in the cylinder 42 and connected to the carriage 30 by a crosshead 48. The arrangement 40 is provided with a bleed conduit 50 communicating the left-hand or forward end of the cylinder 42 with the reservoir 34 and also a supply conduit 52, containing an adjustable regulating valve 54, which connects the rearward or right-hand end of the cylinder 42 with the source 34. The conduit 52 is provided with a pump 56 selectively operable to supply hydraulic fluid from the reservoir 34 to the rearward end of the cylinder 42.

The relative lengths of the barrel 12, the screw 24, the cylinder 42, and the distance of axial travel of the carriage 30 are arranged whereby, with the carriage 30 and the screw 24 at their illustrated extreme rearward or right-hand positions, a space or reservoir 58 is provided in the bore 16 intermediate the forward end 224 of the screw 24 and the valve 20. The volume or capacity of this space or reservoir 58 is, with the screw 24 at its illustrated extreme rearward position, substantially that of the charge of plasticized material to be injected by the screw 24 through the discharge opening 18 in a single operating cycle.

The barrel 12 is provided with a first feed hole or inlet 60 which is spaced longitudinally of the screw 24 from the discharge opening 18 and at a location such that, with the screw 24 in its extreme forward or left-hand position, a fully developed land 28 is provided by the thread or flights 26 beneath the first inlet 60. As shown in FIG. 1, material is preferably fed to the screw 24 through the first inlet 60 from a supply hopper 62 by a vibratory feeder which comprises an inclined feed chute 64 provided with a conventional vibrator 66. The flow of material from the hopper 62 to the feed chute 64 is controlled by a normally closed valve 68 operated by a hydraulic cylinder-and-piston control 70 which is connected by a signal conduit 72a to the supply conduit 38 whereby the control 70 opens the valve 68 in response to fluid flow to the rotary motor 32 through the supply conduit 38. In this manner, the valve 68 is automatically opened upon the initial operation of the rotary motor 32 and maintained open throughout the operation of the latter, but closed when the supply of fluid to the rotary motor 32 is shut off.

In addition, the barrel 12 is provided with a second feed hole or inlet 72 for supplying material to the screw 24. The second inlet 72 is, as shown in FIG. 1, spaced longitudinally of the screw 24 from the discharge opening 18 and the first inlet 60, and is intermediate the inlet 60 and the discharge opening 18. The spacing between the inlets 60, 72 is preferably selected such that the inlets 60, 72 supply material to the screw 24 at locations spaced apart a distance approximating the axial distance between corresponding points on alternate spirals of the screw 24. Material is supplied through the second inlet 72 by a supply conduit 74 which communicates with a storage hopper 76 and is provided with a conventional gear-type pump 78. The pump 78 is driven through a gearing arrangement 80 by a conventional hydraulic motor 82 which receives hydraulic fluid through a supply conduit 84 communicating with the supply conduit 38 and discharges fluid through a return conduit 86 communicating with the source 34. Thus, the pump 78 is operated by the hydraulic motor 82 to supply material through the conduit 74 only during operation of the rotary motor 32.

In accordance with the present invention, for the injection of a polyester premix the hopper 62 will be filled with the glass fiber component of a conventional polyester premix and contain a stock of glass fibers each a fraction of an inch in length. The hopper 76 will be filled with the paste component or remainder of the polyester premix and contain a paste which may, for example, include 50 percent polyester resin dissolved in styrene monomer, 50 percent talc or other filler and the normal quantities of catalyst, accelerator, and other polymerizing agents normally present in a conventional polyester premix.

In the operation of the injection unit 10 to inject the polyester premix, the barrel 12 is initially heated by the coils 14. Thereafter, assuming the screw 24 to be at its extreme forward position in the barrel 12, the pump 36 is actuated to supply hydraulic fluid to the rotary motor 32. Thus, the motor 32 is actuated to initiate rotation of the screw 24 and simultaneously the valve 68 and pump 78 are actuated to provide the glass fiber and paste, respectively, through the inlets 60, 72. The screw rotation intermixes the fiber and paste into a plasticized mixture and conveys the latter to the reservoir 58 forwardly of the screw 24 where, as the valve 20 is closed, this mixture remains. After the volume of the plasticized material in the reservoir 58 becomes sufficiently great to fill the then existing volume of the latter, it commences to force the screw 24 to retreat rearwardly. During this retreat of the screw 24, hydraulic fluid in the cylinder 42 rearwardly of the piston 46 is forced through the supply conduit 52 at the rate dictated by the setting of the regulating valve 54 and flows back into the source 34. Thus, the fiber and paste are continuously fed to the screw 24 throughout the rearward movement of the latter.

When, however, the screw retreats a distance sufficiently great to cause the carriage 30 to trip the limit switch 88, the latter energized the solenoid operating the control 22 for the valve 20 and the latter is resultantly opened. This tripping of the limit switch 88 also energizes the pump 56 whereby the latter supplies hydraulic fluid from the source 34 through the supply conduit 52 to the rearward end of the cylinder 42 and thereby causes the screw 24 to be forwardly driven by such hydraulic fluid. This forward movement of the screw in the conventional manner drives the plasticized material in the reservoir 58 through the discharge opening 18 to the mold of the injection molding machine. Subsequently, the valve 20 again closes whereupon the injection unit 10 commences another operating cycle which proceeds in the before-described manner.

Although I have heretofore described the employment of a vibratory feeder for feeding the screw 24 through the first inlet 60 as this is believed to be the preferred arrangement, it will be understood that other suitable apparatus could be alternatively used for this purpose. Thus, as schematically depicted in FIG. 2, glass fiber or other fibrous material could alternatively be supplied in yarn or roving form through a plurality of pinch rolls 100 to a cutting apparatus 102 comprising an anvil 104 and a rotary blade 106. In this event, the cutting apparatus 102 would cut lengths of the fibrous material from the yarn and could be arranged to discharge the cut lengths to the aforedescribed hopper 62 which, in turn, could discharge directly through the first inlet 60. The operation of an embodiment of the invention including the feed arrangement shown in FIG. 2 is believed to be apparent from the aforegoing description taken in connection with the preceding description of the injection unit 10 shown in FIG. 1.

From the foregoing description it will be seen that I have provided new and improved means for feeding an injection screw. It will, moreover, be seen that, although I have hereinbefore specifically described this means as feeding the components of a polyester premix as this is an application for which it is will suited, this application has been given by way of illustration. For example, although I have described the inlet 60 as supplying glass fibers to the screw 24, alternatively other substances such as sisal, nylon, or other fiber could be so supplied. Moreover, if desired, the before-described means could be employed for successfully feeding the injection screw 24 with substantially any substances.

From the foregoing description, it will also be seen that I have provided a new and improved method for feeding an injection screw. It will also be seen that this method is particularly adapted for feeding polyester premix to an injection screw, but could if desired be employed for feeding other substances to the screw. It will, moreover, be seen that this method, in brief, comprises supplying a first substance to the screw through a first inlet spaced longitudinally of the screw from the discharge opening and supplying a second substance to the screw through a second inlet spaced longitudinally of the screw from the discharge opening (and preferably spaced longitudinally of the screw from the first inlet and intermediate the discharge opening and the first inlet), whereby movement of the screw causes intermixing of the substances and provides through the discharge opening a mixture thereof. It will also be seen that the substances are simultaneously supplied to the screw during the rearward movement of the latter.

It will be understood, however, that the illustrated and hereinbefore specifically described embodiments of my invention have been given by way of illustration only and that the scope and spirit of the invention are not so limited, but rather encompass other variations and embodiments within the scope of the following claims.

I claim:

1. The method of feeding fiber and paste to an injection screw rotatably driven and axially reciprocating in an injection barrel towards and away from a discharge opening, comprising:

supplying fiber to the screw at a first location spaced longitudinally of the screw from the discharge opening; and simultaneously supplying paste to the screw at a second location spaced longitudinally of the screw from the discharge opening and intermediate said first location and the discharge opening, whereby movement of the screw causes intermixing of the fiber and paste and provides through the discharge opening a mixture of the fiber and paste.

2. The method according to claim 1, wherein the fiber is supplied to the screw by a vibratory feeder, and the paste is pumped to the screw.

3. The method according to claim 1 wherein the fiber is supplied by a cutting apparatus adapted to cut and supply lengths of fiber to the screw.

4. The method according to claim 1 wherein the fiber and paste are supplied to the screw only during movement of the screw away from the discharge opening.

5. The method according to claim 1, wherein the fiber is supplied to the screw by a vibratory feeder, the paste is pumped to the screw, and the fiber and paste are supplied to the screw only during movement of the screw away from the discharge opening.

6. The method according to claim 1, wherein said first and second locations are spaced a distance approximating the axial distance between corresponding points on nonadjacent spirals of the screw.

7. The method according to claim 1, wherein the fiber is supplied by a vibratory feeder only during movement of the screw away from the discharge opening, and the paste is supplied by a fluid operated pump arranged to be fluid powered to supply the paste only during movement of the screw away from the discharge opening.

8. In combination with an injection screw rotatably driven and axially reciprocating in an injection barrel towards and away from a discharge opening, fiber supply means arranged to supply fiber to the screw through an inlet at a first location spaced longitudinally of the screw from the discharge opening, and paste supply means arranged to supply paste to the screw through an inlet at a second location spaced longitudinally of the screw from the discharge opening and from said first location and intermediate the discharge opening and said first location, whereby movement of the screw causes intermixing of said fiber and paste and provides through the discharge opening a mixture of fiber and paste.

9. The combination of claim 8, wherein said fiber supply means comprises a vibratory feeder, and said second supply means comprises a pump.

10. The combination of claim 8, wherein said fiber supply means comprises cutting means for cutting and supplying cut lengths of fiber.

11. The combination of claim 8, wherein the space between said inlets approximates the axial distance between corresponding points on nonadjacent spirals of the screw.

12. The combination of claim 8, wherein said fiber supply means comprises a vibratory feeder adapted to supply fiber during movement of the screw away from the discharge opening, and said paste supply means comprises a fluid operated pump which is automatically fluid powered during movement of the screw from the discharge opening.